United States Patent
Rubio

(10) Patent No.: US 8,341,059 B1
(45) Date of Patent: Dec. 25, 2012

(54) SYSTEM, METHOD AND APPARATUS FOR CREATING AND EXECUTING INTER-EXCHANGE SPREAD INSTRUMENTS

(75) Inventor: Thomas Rubio, Highland Park, IL (US)

(73) Assignee: Breakwater Trading, LLC, Chicago, IL (US)

( * ) Notice: Subject to any disclaimer, the term of this patent is extended or adjusted under 35 U.S.C. 154(b) by 321 days.

(21) Appl. No.: 12/611,248

(22) Filed: Nov. 3, 2009

Related U.S. Application Data

(60) Provisional application No. 61/110,817, filed on Nov. 3, 2008.

(51) Int. Cl.
*G06Q 40/00* (2012.01)

(52) U.S. Cl. .......................... 705/36 R; 705/37

(58) Field of Classification Search ................. 705/1–50; 237/1–18; 338/1–63; 345/59–150; 715/15
See application file for complete search history.

(56) References Cited

U.S. PATENT DOCUMENTS

| | | | |
|---|---|---|---|
| 7,260,554 B2 | 8/2007 | Morano et al. | |
| 7,389,264 B2 | 6/2008 | Kemp, II et al. | |
| 7,424,450 B2 | 9/2008 | Kemp, II et al. | |
| 2003/0130929 A1* | 7/2003 | Waddell | 705/37 |
| 2006/0259409 A1* | 11/2006 | Burns et al. | 705/37 |
| 2007/0118457 A1 | 5/2007 | Peterffy et al. | |

OTHER PUBLICATIONS

Benjamin et al., Explaining Credit Default Swap Spreads with Equity Volatility and Jump Risks of Individual Firms, Bank for International Settlements, web, 1-18.*

* cited by examiner

*Primary Examiner* — Marissa Liu
(74) *Attorney, Agent, or Firm* — Patzik, Frank & Samotny Ltd.

(57) ABSTRACT

A system, method and apparatus for creating and executing inter-exchange spread instruments, comprising a buy and a sell leg (or other variation of buys and/or sells) of two distinct global exchange traded instruments. A spread instrument price is set using an implied base price of a first leg based upon a current bid and offer of the first leg on a global exchange, an implied base price of a second leg based upon a current bid and offer of the second leg on a global exchange, a first leg weighting factor, a second leg weighting factor, and a volatility risk factor. When the spread instrument is traded, each underlying leg is automatically filled and confirmed pursuant to the customs and practices of the corresponding exchange and clearinghouse or clearing firm for the product associated with the leg.

6 Claims, 3 Drawing Sheets

SYSTEM, METHOD AND APPARATUS FOR CREATING AND EXECUTING INTER-EXCHANGE SPREAD INSTRUMENTS

CROSS-REFERENCE TO RELATED APPLICATIONS

This application claims the benefit of U.S. provisional application No. 61/110,817, filed Nov. 3, 2008, the entirety of which is hereby incorporated by reference.

BACKGROUND OF THE INVENTION

1. Field of the Invention

The present invention relates, in general, to financial instruments and, more particularly, to a method of creating standardized spread instruments, a system of executing and clearing the underlying inter-exchange traded legs of such instruments with the applicable global exchanges and clearing parties, and an apparatus for implementing the methods and systems of the invention.

2. General Background of the Invention

Financial instruments such as stocks, bonds, currencies commodities and derivatives (e.g., futures and options instruments related to such instruments) are traded either on regulated exchanges or directly between trading parties on an over-the-counter (i.e., off-exchange) basis. Exchange-traded derivatives are standardized contracts (e.g. futures and options) that are bought and sold on organized futures exchanges located throughout the world. Unlike the over-the-counter markets, the exchanges provide regulatory protection and clearing services to its trading participants.

Trades executed through a global exchange are held on the books of a firm that is a "clearing" member of the exchange's clearing organization. If buyers or sellers are not themselves clearing members of an exchange, they transact through clearing brokers associated with clearing members of the exchange. When a buy and sell order of two clearing members for a derivative instrument (e.g., a futures or options instrument) is matched by an exchange, performance and satisfaction of the contract is no longer between the original buyer and seller instead, it is between the buyer and the exchange's clearing party, and between the seller and the exchange's clearing party. The exchange's clearing party guarantees performance of every contract to each of its clearing members thereby effectively eliminating the counterparty credit risk associated with over-the-counter trading.

Spread trading is buying one or more instruments and concurrently selling one or more instruments to profit (or to otherwise hedge against an open position) based on changes in the correlation of the instrument(s) to each other. Spread trades are derivative trades that profit (or conversely lose) from a directional move in one or more risk factors or instruments (referred to as the "first leg") and an opposite directional move in another risk factor or instrument (referred to as the "second leg"). Inter-exchange spread trades have inherent execution risk. For example, prior to execution of the underlying legs on the separate global exchanges, there may be price slippage in one or both legs. A spread instrument allows a trader to gain exposure to the movement in a relationship between risk factors of financial instruments including, for example securities, indices, currencies and commodities, without having to separately purchase and/or sell the underlying legs of the trade.

In some prior art spread instruments and systems, legging risks exist. Particularly, a market maker or other person or entity may have to assume the risk that one or both of the underlying legs of the spread instrument will not execute. In a traditional spread scenario, a trader has to execute the first leg with one party at one exchange and then attempt to quickly execute the second leg with another party at another exchange. Even with sophisticated spread trading tools, traders may well incur price slippage while working the second leg.

Accordingly, it is an object of the present invention to provide a system, method and apparatus for creating and executing inter-exchange spread instruments, wherein there is little or no legging risk.

It is also an object of the present invention to provide a system, method and apparatus for creating and executing inter-exchange spread instruments, wherein the spread instruments are created in a manner wherein the buyer and seller of the instrument effectively agree upon the price of all underlying legs at the time the spread instrument is bought and sold (i.e., matched).

It is another object of the present invention to provide a system, method and apparatus for creating and executing inter-exchange spread instruments, wherein the underlying legs of the spread instrument automatically execute.

These and other objects and features of the present invention will become apparent in view of the present specification, drawings and claims.

SUMMARY OF THE INVENTION

The present invention presents a method of creating standardized tradable products comprising the spread of related financial instruments which are traded on two or more exchanges located anywhere throughout the world. As a market participant buys or sells the spread instrument, the product's underlying inter-exchange spread legs are automatically filled and confirmed pursuant to the customs and practices of the applicable exchanges and their respective clearing party, thereby reducing or eliminating the execution risk historically associated with spread transactions.

The spread instruments of the present invention comprise standardized trading instruments derived from the relationships between two or more exchange-traded products. The distinct instruments comprising the spread instrument are each referred to as a component leg of the spread. A spread instrument typically involves buying one leg and selling another leg, but may alternatively involve either buying two legs or selling two legs. Moreover, spread instruments comprising more than two legs and variations of buys and/or sells are likewise contemplated by the present invention. Inherently, the current market price of a spread instrument reflects the differences between the implied prices of the underlying spread legs (based on the dynamic market bids and offers associated with each leg), factoring in a proprietary volatility variable based on the degree of unpredictable changes over time in the relationship of the underlying legs.

Whenever a buyer and seller trade a spread instrument of the present invention, the underlying legs will automatically be filled and confirmed pursuant to the customs and practices of the applicable exchanges and their respective clearing party. As a result, there is virtually no execution risk. Accordingly, once the parties agree on a price for the spread instrument, the transaction is complete. Because a creator of a spread instrument of the present invention is effectively a market maker and authorized to create the spread instrument by the applicable global exchanges where each of the underlying legs are traded, a creator of a spread instrument of the present invention is able to work with greater spreads between bid and offer, and is accordingly able to guarantee against the effects of leg price slippage by automatically filling the instrument's underlying legs and factoring in volatility risk into the overall price at which the spread instrument will be traded.

The invention accordingly includes algorithms to create spread instruments such that the bid/offer is as tight or narrow as possible. For example, there will be more activity and liquidity in an instrument when the bid is 11 and the offer is 13 than there would be if the bid is 11 and the offer is 20. In the former situation, the relatively tight spreads encourage trades at 12. As soon as parties agree on the 12 price, the spread instrument is traded and the underlying legs are automatically executed and filled. As the buyer and seller have effectively agreed upon both legs of the spread instrument through the act of executing it, legging risk is effectively eliminated.

DETAILED DESCRIPTION OF THE INVENTION

Figure 1:
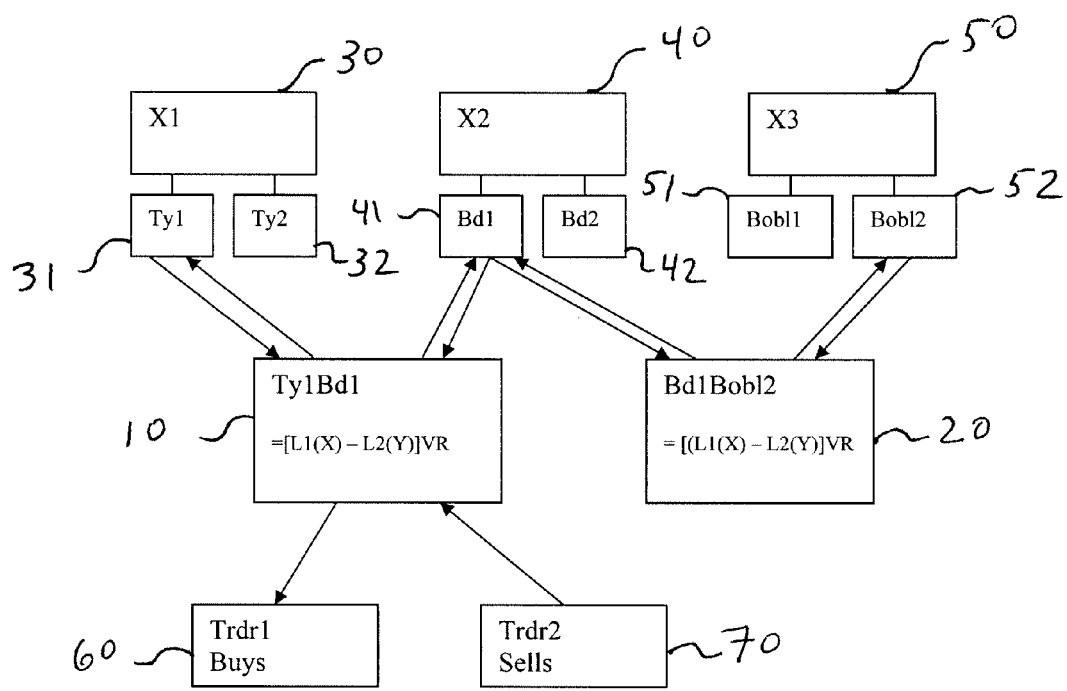
FIG. 1 of the drawings is a block diagram showing the creation of two spread instruments of the present invention, as well as the automatic execution and fill of the legs of one of the spread instruments.

While the present invention is applicable to inter-exchange spread instruments comprising n legs, wherein n is any integer greater than or equal to two, an example spread instrument for n=2 will first be discussed in detail.

Spread instrument prices are generally determined by adding and/or subtracting prices of one instrument with one or more other distinct instruments. The price of a spread instrument of the present invention, comprising a buy and a sell leg of two distinct inter-exchange traded instruments, may be illustrated by the following equation:

$$SI=(L1(X)-L2(Y))\times VR$$

Where:
SI=Spread Instrument Price
L1=implied price based on current bid and offer of the first leg
L2=implied price based on current bid and offer of the second leg
X=first leg weighting factor
Y=second leg weighting factor
VR=volatility risk factor The price of a spread instrument of the present invention, comprising n legs may be illustrated by the following equation:

$$SI=(L1(X)+/-L2(Y)+/-Ln(Z))\times VR$$

Where:
Ln=implied price based on current bid and offer of the nth leg
Z=n leg weighting factor The implied price of each leg, or underlying financial instrument of the spread instrument, is typically determined by the exchange on which the financial instrument is listed. For example, in conjunction with financial instruments comprising futures listed on a particular exchange, the determination of an implied price may involve, for example, the creation of first generation implied orders and second generation synthetic orders, allocation matching algorithms for order filling, and may further include the participation of a firm or trader designated by the exchange to facilitate a two-sided market for a given financial product.

The first, second and n leg weighting factors, X, Y and Z, respectively, are dynamic in nature and are assigned appropriate values to normalize or equalize the otherwise disparate underlying financial instruments that together make up the overall spread instrument. The weighting factors are comprised of instrument relationship ratios and conversion rates. The weighting factors may be determined by comparing the relationships of the underlying legs to each other or by comparing the relationship of each leg to a baseline instrument (Lb) which is different and distinct than the instruments comprising the underlying legs. For example, the weighting factors X and Y may be calculated by comparing the characteristics of leg L1 and leg L2 against each other. Alternatively, weighting factors X and Y may be calculated by comparing the characteristics of leg L1 and leg L2, respectively, against the baseline instrument Lb.

A relationship ratio weighting factor is applied so that the underlying legs of a spread instrument are comparable instruments. This ratio can be calculated using the dollar value of a basis point (DV01) of each instrument with the DV01 of one leg as the numerator and the DVO1 of another leg as the denominator. For example, if Leg 1 (a 10-year U.S. Treasury note futures) has a DVO1 of $68.50 and Leg2 (a Bund futures has a Euro 83.8 DV01), the ratio formula, expressed in terms of Bund contracts per 10-year Treasury note contracts, is:

$$\text{Relationship ratio} = \frac{\text{10-year Treasury note } DV01}{\text{Bund } DV01} = \frac{\$68.50}{\text{Euro } 83.8} = .8174$$

Or

Leg1 $68.50 (1.0)=Leg 2 Euro 83.8(0.8174)

The weighting factors may also take product characteristics (e.g., currency denominations and tick sizes) into account. Accordingly, a conversation rate weighting factor is applied so that the instrument's underlying legs are uniform with regard to their respective product specifications. For example, the conversation rate will equalize legs that are traded in different currencies (i.e., Euros and U.S. Dollars) by converting the legs to the uniform currency (e.g., both U.S. Dollars). Thus, if the Euro-U.S. dollar exchange rate is 1.4734 Euros to one U.S. Dollar, the conversation rate of Leg 1 (a 10-year U.S. Treasury not futures) to Leg2 (a Bund futures), is expressed as:

Conversation rate=Euro/U.S. Dollar=1.4734 Euro/ $1.00 or

Leg1(1.0)—Leg2(1.4734)

The weighting factor in this example consisting of both the relationship ratio and conversation rate may be expressed as follows:

$$\frac{\text{10-year Treasury note } DV01 \times (\text{Euros/U.S \$})}{\text{Bund } DV01} = \frac{68.50 \times 1.4734}{83.8} = 1.2044$$

or

Leg1(1.042)—Leg2(1.0)

Volatility risk (VR) is generally an estimate of how much the spread instrument will rise or fall around a steady price. The volatility risk factor of the spread instrument is a dynamic multiplier used to adjust the price of the spread instrument to take into account the various volatilities and risk factors associated with the component legs of the spread instruments which may or may not otherwise be inherently present in the prices of such legs.

Once a spread instrument is bought and sold, its underlying legs are automatically filled and confirmed pursuant to the customs and practices of the applicable exchanges and guaranteed by their respective clearing firms, effectively guaranteeing each party's performance of the spread instrument and reducing or eliminating execution risk. The separate underlying legs are accordingly shown on each trader's books.

Referring to FIG. 1, two example spread instruments 10, 20 of the present invention are shown, collectively having underlying legs, such as futures, traded on, in this particular example, three different international exchanges. In particular, exchanges designated X1 30, X2 40, and X3 50 are shown. On exchange X1 30, ten year U.S. Treasury futures products, designated Ty1 31 and Ty2 32, are traded. On exchange X2 40, Bundesanleihen (Bund), or 10 year German federal government bond futures products, designated Bd1 41 and Bd2 42, are traded. On exchange X3 50, Bundesobligationen (Bobl), or shorter duration German federal government note futures products, designated Bobl1 51 and Bobl2 52, are traded.

A first example spread instrument of the present invention, designated Ty1Bd1 10, comprises the spread between a purchase of a Ty1 futures product 31 on exchange X1 30 and the simultaneous sale of a Bd1 futures product 41 on exchange X2 40. The price of this spread instrument is equal to the implied price of the Ty1 product 31 (based upon its current bid and offer), multiplied by a first leg weighting factor, minus the implied price of the Bd1 product 41 (based upon its current bid and offer), multiplied by a second leg weighting factor, collectively multiplied by the volatility risk factor assigned to the spread instrument (based upon perceived volatility of the underlying markets and contemplated risk involved in executing the underlying legs). When the Ty1Bd1 spread instrument 10 is traded, as indicted by the "Tdr1 Buys" (Trader #1 buys) event 60 and "Tdr2 Sells" (Trader #2 sells) event 70 designations, each leg of instrument 10 is automatically and substantially immediately filled (i.e., the buy and sell of the underlying Ty1 product 31 is filled and confirmed pursuant to the customs and practices of the exchange X1 30, and the underlying buy and sell of the underlying Bd1 product 41 is simultaneously filled and confirmed pursuant to the customs and practices of exchange X2 40, with the involvement of each exchange's respective clearing entity for the underlying products.

A second spread instrument of the present invention, designated Bd1Bobl2 20, is also shown in FIG. 1 and comprises the spread between a purchase of a Bd1 futures product 41 on exchange X2 40 and the simultaneous sale of a Bobl2 futures product 52 on exchange X3 50. The price of this spread instrument is equal to the implied price of the Bd1 product 41 (based upon its current bid and offer), multiplied by a first leg weighting factor, minus the implied price of the Bobl2 product 52 (based upon its current bid and offer), multiplied by a second leg weighting factor, collectively multiplied by the volatility risk factor assigned to the spread instrument 20 (based upon perceived volatility of the underlying markets and contemplated risk involved in executing the underlying legs). When the Bd1Bobl2 spread instrument 20 is traded, each leg of the instrument is automatically and substantially immediately filled (i.e., the buy and sell of the underlying Bd1 product 41 is filled and confirmed pursuant to the customs and practices of exchange X2 40, and the buy and sell of the underlying Bobl2 product 52 is simultaneously filled and confirmed pursuant to the customs and practices of exchange X3 50, each with the involvement of the clearing institution associated with the exchange.

Figure 2:
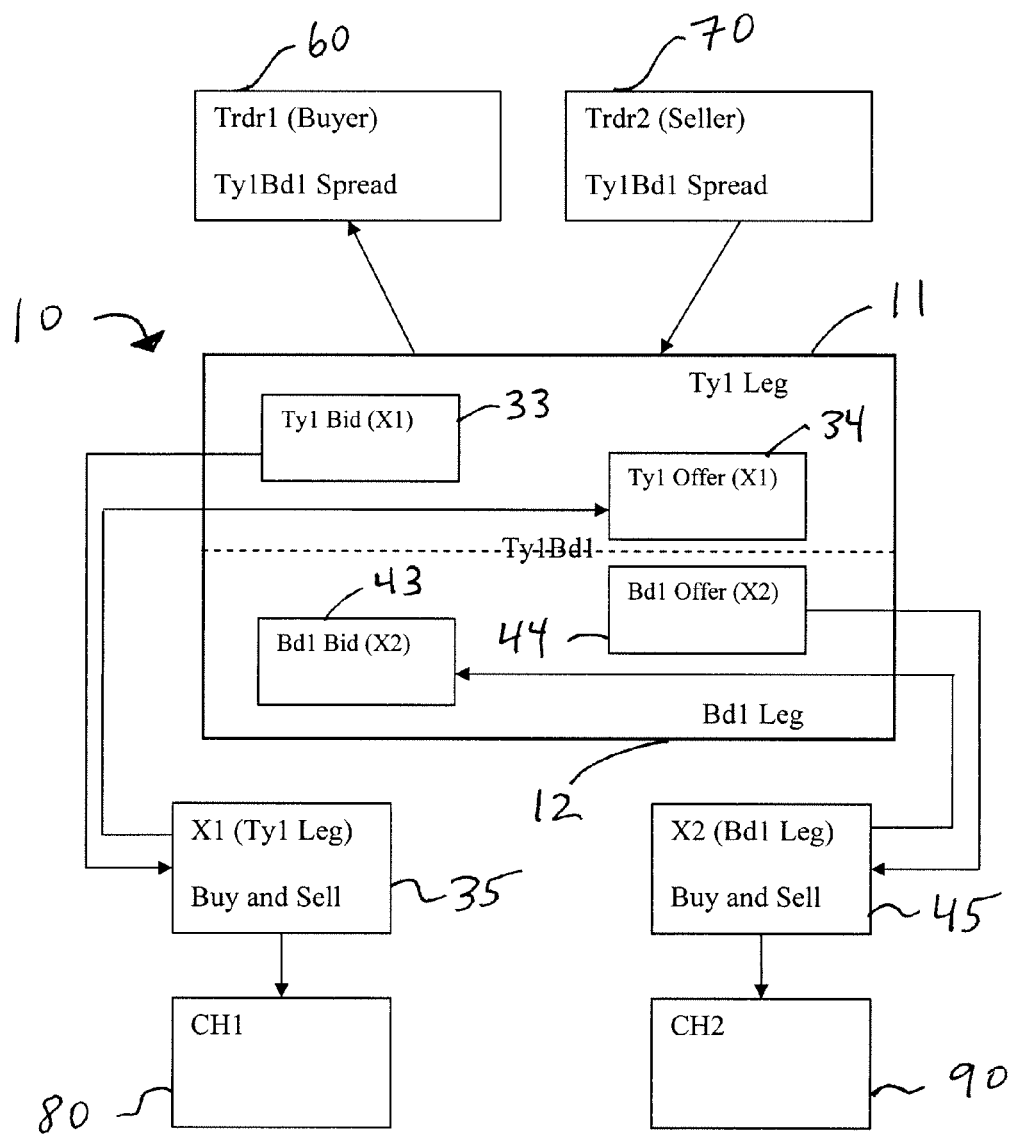
FIG. 2 of the drawings is a block diagram showing, in further detail, the creation and execution of a spread instrument of the present invention.

The creation and automatic execution of a spread instrument according to the present invention is shown in further detail in FIG. 2. The illustrated spread instrument, designated Ty1Bd1 10, comprises the spread between a purchase of a Ty1 futures product 31 on exchange X1 30 (designated the Ty1 Leg 11) and the simultaneous sale of a Bd1 futures product 41 on exchange X2 40 (Designated the BD1 Leg 12). As shown in FIG. 2, the price of this spread instrument is based, in large part, upon an implied price of the Ty1 product 31, calculated using the current bid 33 and offer 34 values of this product on the X1 exchange 30, and the implied price of the Bd1 product 41, calculated using the current bid 43 and offer 44 values of this product on the X2 40 exchange.

When the Ty1Bd1 spread instrument 10 is traded, as indicted by the "Trdr1 (Buyer)" (Trader #1 buys) 60 and "Tdr2 (Seller)" (Trader #2 sells) 70 designations, each leg of the instrument is automatically and substantially immediately filled as indicated by the X1 (Ty1 Leg) 35 and X2 (Bd1 Leg) 45 designations, showing that the Ty1 leg 11 of the spread instrument 10 is filled on the X1 exchange 30 by matching the buy and sell components of the Ty1 instrument 31 and the Bd1 leg 12 of the spread instrument 10 is filled on the X2 exchange 40 by matching the buy and sell components of the Bd1 instrument 41. Moreover, as shown in FIG. 2, each leg is filled by transmittal of appropriate orders through a clearing house or clearing institution associated with the applicable exchanges. In this example, clearing house CH1 80 is associated with the X1 exchange 30, and clearing house CH2 90 is associated with the X2 exchange 40.

For spread instruments of the present invention having more than two legs (i.e., wherein n>2), in determining the overall pricing of the spread instrument, each leg of the spread instrument will have its own implied price, based upon the current bid and offer for the leg on its associated exchange. Moreover, each leg will have its own associated leg weighting factor assigned. Furthermore, either one or a plurality of volatility risk factors may be assigned for such spread instruments. For example, each leg of such spread instruments may have its own volatility risk factor. Alternatively, individual volatility risk factors may be determined and applied to pairs, or groupings of other subsets, of the individual legs that collectively form the overall spread instrument. As another alternative, a single volatility risk factor may be determined and applied to the overall spread instrument, as in the example above for the spread instrument having two legs.

Figure 3:
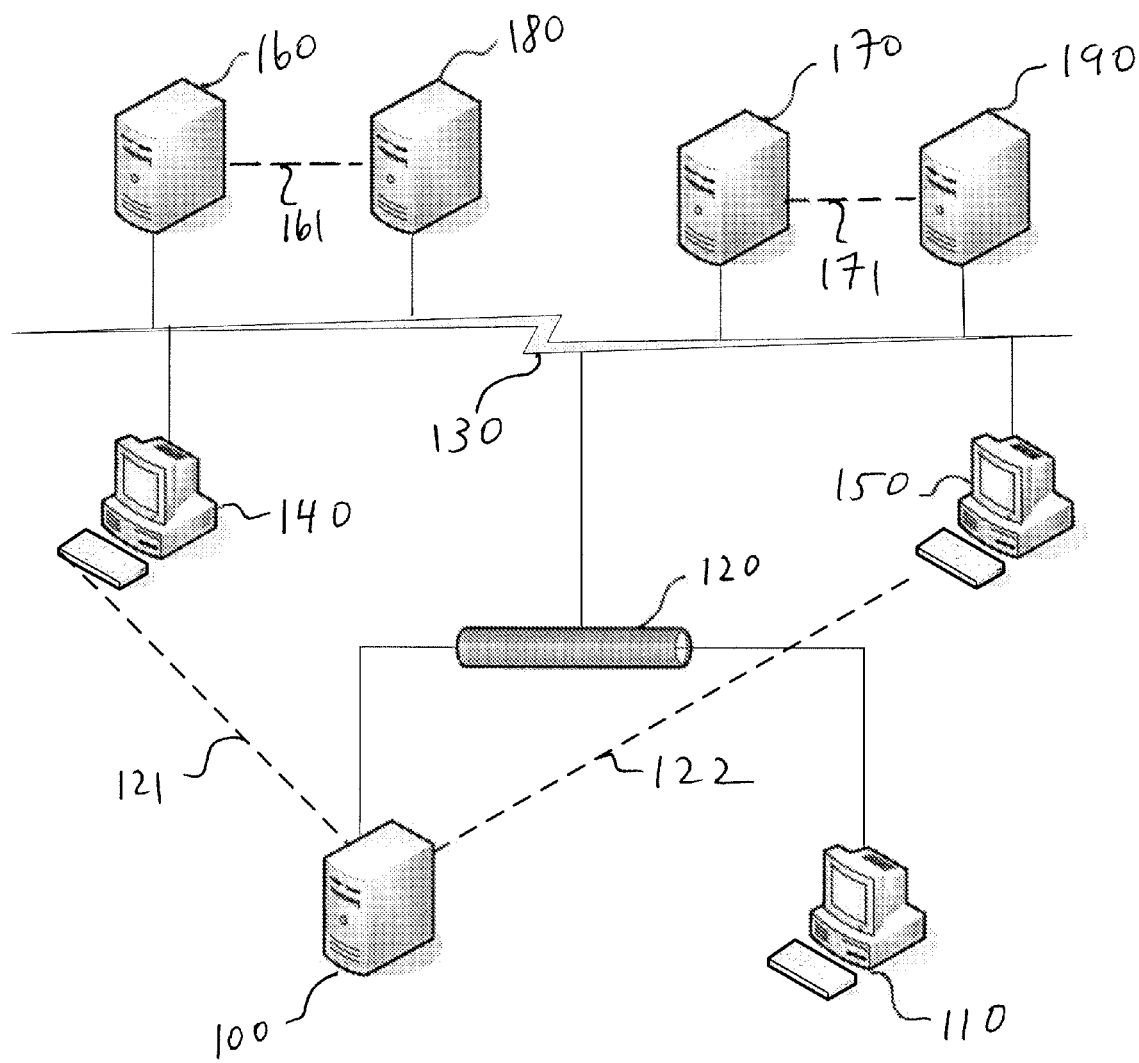
FIG. 3 of the drawings is a block diagram of an apparatus for creating and executing a spread instrument of the present invention.

An example of an apparatus for performing the methods and implementing the system of the present invention is shown in FIG. 3. The market maker for a spread instrument of the present invention employs a spread instrument server 100 and one or more spread instrument terminals 110 (typically in the form of personal computers or workstations), networked together by a local area network, or LAN 120, and, in turn, connected via appropriate routers and firewalls (not shown in FIG. 3) to a wide area or global network, such as the Internet 130.

Via the Internet 130, or direct connectivity (as shown by dashed lines 121 and 122 in FIG. 3), the market maker's spread instrument server 100 can, in turn, be securely accessed by terminals of authorized buyers and sellers, including buyer terminal 140 and seller terminal 150 of FIG.

3. Moreover, via the Internet 130, the spread instrument server can securely communicate, using predetermined protocols, with the servers for the various international exchanges, such as server 160 for exchange X1 and server 170 for exchange X2, on which the underlying legs of the spread instruments are listed. Each exchange may likewise use secure Internet connections, or direct connectivity (as shown by dashed lines 161 and 171 in FIG. 3), to communicate with their associated clearinghouses, such as server 180 of clearinghouse CH1 associated with exchange X1, and server 190 of clearinghouse CH2 associated with exchange X2, in order to complete the legging transactions.

Using spread instrument terminal 110, a market maker for a specific spread instrument product accesses the listings of exchanges X1 and X2, made available through respective user interfaces, such as web pages, generated by listing software modules and user interface generator software modules executing on X1 server 160 and X2 server 170, and subsequently rendered on spread instrument terminal 110, such as in a web browser running a secure session using HTTPS secure protocol, and selects suitable products on each exchange to be combined together into a spread instrument. Using spread instrument terminal 110 and a user interface generated by a user interface generator software module of spread instrument server 100 and rendered on spread instrument terminal 110, the market maker assigns and appropriate leg weighting factors to each of the selected products to normalize their relative values by inputting desired values into the user interface on spread instrument terminal 110, and likewise assigns an appropriate volatility risk factor value in order to set an overall price associated with the newly created spread instrument, again by inputting desired values into the user interface on spread instrument terminal 110. Upon receiving from the user interface previously generated on instrument terminal 110 an identification of the products that comprise the spread instrument to be created, the associated leg weighting factors, and the associated volatility risk factor, a spread instrument creation software module running on spread instrument server 100 creates a new spread instrument, and a listing software module lists the newly created spread instrument on spread instrument server 100, which effectively becomes another exchange, albeit one that operates in conjunction with exchanges X1 and X2. Alternatively, or in addition, the spread instrument may be listed directly on exchange X1 and/or exchange X2, by relaying all necessary details of the spread instrument, including identification of the underlying products, associated leg weighting factors, and the associated volatility risk factor, from spread instrument server 100 to X1 server 160 and/or X2 server 170.

Authorized potential buyers and sellers of spread instruments of the present invention use their respective terminals, such as buyer terminal 140 and seller terminal 150, to securely access the spread instrument server 100 via the Internet 130, or by direct connectivity (as shown by dashed lines 121, 122 in FIG. 3), and to view the spread instrument products listed thereon. Specifically, a spread instrument listing software module and a user interface generation module execute on spread instrument server to issue a user interface, such as a secure web page, to buyer terminal 140 and seller terminal 150, amongst other terminals linked to spread instrument server 100 via the Internet 130. When a buyer and seller agree to buy/sell a listed spread instrument, instructions are issued by the buyer and seller from their respective terminals 140, 150 to the spread instrument server 100 via the respective user interfaces described above and rendered on terminals 140 and 150. Specifically, a buyer enters a buy instruction for a spread instrument into the user interface rendered on buyer terminal 140, and the user interface of buyer terminal 140 issues the buy instruction to a transaction software module executing on spread instrument server 100. Likewise, a seller enters a sell instruction for the same spread instrument into the user interface rendered on seller terminal 150, and the user interface of seller terminal 150 issues the sell instruction to the transaction software module running on spread instrument server 100. This, in turn, causes the transaction model of spread instrument server 100 to automatically issue appropriate fill confirmations, in the form of electronic instructions issued via internet 130 to the respective exchange servers pursuant to the customs, practices, and predetermined data protocols of the applicable exchanges, such as exchange servers X1 160 and X2 170, in order to fill the legs that underlie the spread instrument being traded. This further causes each exchange server associated with a leg being filled to automatically transmit the associated leg order to its assigned clearinghouse or clearing organization for the associated product, such as leg orders issued from exchange server X1 160 to clearing house server CH1 180, and from exchange server X2 170 to clearing house server CH2 190. As a result, once a buyer and seller agree upon a spread trade using the spread instrument of the present invention, the underlying legs are automatically traded, without risk that one or both of the underlying legs will not be able to be filled.

It will be understood that modifications and variations may be effected without departing from the spirit and scope of the present invention. It will be appreciated that the present disclosure is intended as an exemplification of the invention and is not intended to limit the invention to the specific embodiments illustrated and described. The disclosure is intended to cover, by the appended claims, all such modifications as fall within the scope of the claims.

What is claimed is:

1. A method of creating and executing a spread instrument having n financial products, wherein n>=2, comprising the steps of:

receiving at a first server an identification of a first financial product listed on a first exchange, the first financial product having a first bid price and a first offer price, the identification of the first financial product being transmitted from a terminal associated with a market maker;

receiving at the first server an identification of selecting a second financial product listed on a second exchange, the second financial product having a second bid price and a second offer price, the identification of the second financial product being transmitted from the terminal associated with the market maker;

receiving at the first server an assignment of a first leg weighting factor for the first financial product, the first leg weighting factor being transmitted from the terminal associated with the market maker;

receiving at the first server an assignment of a second leg weighting factor for the second financial product, the second leg weighting factor being transmitted from the terminal associated with the market maker;

receiving at the first server an assignment of at least one volatility risk factor for the spread instrument, the at least one volatility risk factor being transmitted from the terminal associated with the market maker;

executing a software module on the first server to assign a price to the spread instrument calculated using, as inputs, the first bid price, the first offer price, the second bid price, the second offer price, the first leg weighting factor, the second leg weighting factor, and the at least one volatility risk factor; and listing the spread instrument on an exchange as a unitary tradable instrument, the unitary tradable instrument being capable of being bought and sold by diverse trading entities.

2. The method according to claim 1, further comprising the steps of:

automatically transmitting a first fill confirmation for the first financial product from the first server to a server associated with the first exchange pursuant to customs and practices of the first exchange and its associated first clearing institution upon receipt of corresponding buy and sell instructions received by the first server and issued from a buyer's terminal and a seller's terminal, respectively; and automatically transmitting a second fill confirmation for the second financial product to the first server to a server associated with the second exchange pursuant to customs and practices of the second exchange and its associated second clearing institution upon receipt of corresponding buy and sell instructions received by the first server and issued from the buyer's terminal and the seller's terminal, respectively.

3. The method according to claim 2, wherein the step of automatically transmitting the first fill confirmation for the first financial product causes the server associated with the first exchange to automatically route the order to the server associated with the first clearing institution.

4. The method according to claim 2, wherein the step of automatically transmitting the second fill confirmation for the second financial product causes the server associated with the second exchange to automatically route the order to the server associated with the second clearing institution.

5. The method according to claim 1, wherein the exchange that the unitary tradable instrument is listed upon is the first server.

6. The method according to claim 1, wherein the exchange that the unitary tradable instrument is listed upon is an exchange other than the first server.

\* \* \* \* \*